(No Model.)
G. A. WEBER.
RAIL FASTENING.
No. 531,349. Patented Dec. 25, 1894.
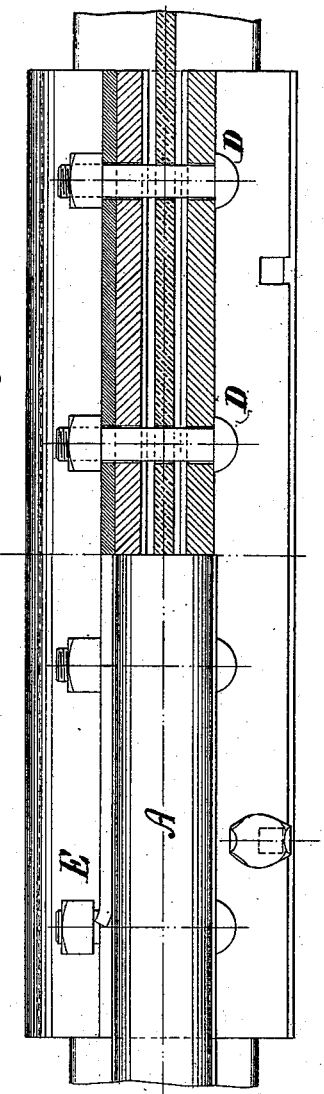
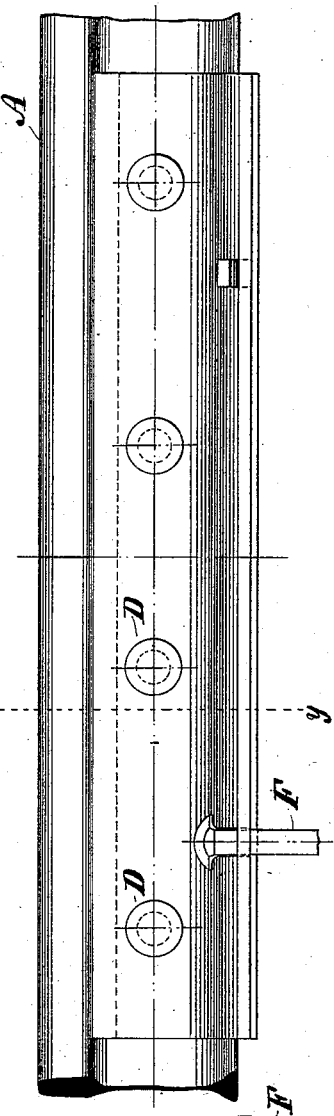
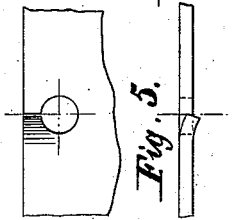
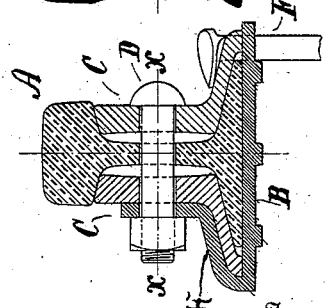
Witnesses
Hnw. A. Pollock
Lon Littlejohn
Inventor
George A. Weber
By his Attorneys

United States Patent Office.

GEORGE A. WEBER, OF NEW YORK, N. Y., ASSIGNOR TO THE WEBER RAILWAY JOINT MANUFACTURING COMPANY, OF WEST VIRGINIA.

RAIL-FASTENING.

SPECIFICATION forming part of Letters Patent No. 531,349, dated December 25, 1894.

Application filed July 10, 1891. Serial No. 399,102. (No model.)

*To all whom it may concern:*

Be it known that I, GEORGE A. WEBER, of the city, county, and State of New York, have invented a new and useful Improvement in Rail-Fastenings, of which the following is a full, true, and exact description, reference being had to the accompanying drawings.

This invention relates to a new and useful improvement in rail fastenings, in which the ends of the rail may be firmly held together and the nuts prevented from turning on the bolts by a nut-lock formed of the fish plate itself.

My invention will be readily understood from the accompanying drawings, in which—

Figure 1, represents a plan view partly in section on the line $x\ x$, Fig. 3; Fig. 2, a lateral elevation; Fig. 3, a cross-section through Fig. 2 on the line $y\ y$; Fig. 4, a lateral elevation of part of the fish plate, showing the locking device; and Fig. 5, a plan view of the same.

A represents the rail; B, the chair; C C, the fish plates; D, the locking bolts provided with nuts E, and F spikes.

The chair B is flat at one side, and the other side is bent upward and inward, as plainly shown at H, in Fig. 3, so as to embrace and surround the fish plate C, having approximately the same shape as the flange of the rail. Its upper edge is slotted above the bolt-holes, as shown in Figs. 4 and 5, so that part thereof may be bent out to lock the nut, as clearly shown. The opposite edge may be provided with openings through which spikes F may pass, which likewise pass through suitable openings in the fish plate C.

What I claim as my invention, and desire to secure by Letters Patent, is—

1. The combination of the rail A, fish plate C, bolt D, and rolled metal chair B, provided with the portion H integral therewith, and bent upward, inward and again upward, so that when in position the part H is in vertical contact with the fish plate C and the foot of the rail is in contact with the horizontal surface of said chair, the rail, fish plate and chair being bolted together, substantially as described.

2. The combination of the rail A, fish-plate C, bolt D, and rolled metal chair B, provided with the portion H integral therewith and bent upward and inward so that when in position the part H is in contact with the fish-plate C, and the foot of the rail is in contact with the horizontal surface of said chair, the fish-plate C and the chair B being correspondingly slotted for the passage of the spike F, substantially as described.

In testimony whereof I have signed my name to this specification in the presence of two subscribing witnesses.

GEO. A. WEBER.

Witnesses:
H. CANTANT,
S. O. EDMONDS.